(12) United States Patent
Aissi (10) Patent No.: US 8,768,842 B2
(45) Date of Patent: Jul. 1, 2014

(54) SECURED AND SELECTIVE RUNTIME AUDITING SERVICES USING A TRUSTED COMPUTING DEVICE

(75) Inventor: Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 12/176,993

(22) Filed: Jul. 21, 2008

(65) Prior Publication Data

US 2009/0164377 A1 Jun. 25, 2009

Related U.S. Application Data

(62) Division of application No. 10/612,292, filed on Jun. 30, 2003, now Pat. No. 7,409,370.

(51) Int. Cl.
*G06Q 30/02* (2012.01)

(52) U.S. Cl.
USPC ............... 705/50; 700/222; 705/60; 705/69; 726/4; 726/25

(58) Field of Classification Search
USPC ......... 713/164; 726/7, 25, 4, 12, 13; 707/204; 705/14; 235/386
See application file for complete search history.

(56) References Cited

U.S. PATENT DOCUMENTS

| | | | |
|---|---|---|---|
| 4,734,865 A * | 3/1988 | Scullion et al. ............... | 700/222 |
| 5,032,979 A * | 7/1991 | Hecht et al. ................... | 726/25 |
| 5,832,458 A * | 11/1998 | Jones .............................. | 705/14 |
| 6,108,644 A * | 8/2000 | Goldschlag et al. ............. | 705/69 |
| 6,126,332 A * | 10/2000 | Cubbage et al. .................. | 710/2 |
| 6,460,141 B1 * | 10/2002 | Olden ............................... | 726/4 |
| 6,526,509 B1 | 2/2003 | Horn et al. | |
| 6,711,400 B1 | 3/2004 | Aura | |
| 6,718,467 B1 | 4/2004 | Trostle | |
| 6,868,406 B1 * | 3/2005 | Ogg et al. ........................ | 705/60 |
| 6,950,522 B1 | 9/2005 | Mitchell et al. | |
| 6,996,715 B2 | 2/2006 | Greenberg et al. | |
| 7,007,164 B1 | 2/2006 | Euchner | |
| 7,373,509 B2 | 5/2008 | Aissi et al. | |
| 7,409,370 B2 | 8/2008 | Aissi | |
| 2002/0042726 A1 | 4/2002 | Mayaud | |
| 2004/0162987 A1 * | 8/2004 | Doyle et al. ................... | 713/186 |
| 2004/0238632 A1 * | 12/2004 | Homewood et al. .......... | 235/386 |
| 2004/0267668 A1 | 12/2004 | Aissi | |
| 2005/0149730 A1 | 7/2005 | Aissi et al. | |

FOREIGN PATENT DOCUMENTS

WO  WO97/02679  *  1/1997  ............... H04L 9/32

OTHER PUBLICATIONS

P. Syverson, D. Goldschlag, and M. Reed, "Anonymous Connections and Onion Routing", Proceedings of the IEEE Symposium on Security and Privacy, IEEE CS Press, May 1997.*

"U.S. Appl. No. 10/750,340, Notice of Allowance mailed Dec. 31, 2007", 12 pgs.

(Continued)

*Primary Examiner* — Robert Niquette (74) *Attorney, Agent, or Firm* — Schwegman, Lundberg & Woessner, P.A.

(57) ABSTRACT

In an embodiment, an apparatus includes a control logic to selectively audit transactions between the apparatus and a separate entity based on a type for the transactions. The apparatus also includes an encryption logic to encrypt an audit log that includes at least one attribute of one of the selectively audited transactions.

23 Claims, 6 Drawing Sheets

(56) References Cited

OTHER PUBLICATIONS

"U.S. Appl. No. 10/371,349, Non-Final Office Action mailed May 16, 2007", 10 pgs.

"U.S. Appl. No. 10/612,292, Amendment Under 37 C.F.R. filed Mar. 26, 2007", 15 pgs.

"U.S. Appl. No. 10/612,292, Final Office Action mailed Apr. 20, 2006", 11 pgs.

"U.S. Appl. No. 10/612,292, Non-Final Office Action mailed Sep. 23, 2005", 7 pgs.

"U.S. Appl. No. 10/612,292, Response filed Jan. 23, 2006 Non-Final Office Action mailed Sep. 23, 2005", 11 pgs.

"U.S. Appl. No. 10/612,292, Response filed Jun. 20, 2006 to Final Office Action mailed Apr. 20, 2006", 14 pgs.

"U.S. Appl. No. 10/612,292, Advisory Action mailed Jul. 14, 2006", 3 pgs.

"U.S. Appl. No. 10/612,292, Response filed Jun. 30, 2005 to Restriction Requirement mailed Jun. 7, 2005", 7 pgs.

"U.S. Appl. No. 10/612,292, Response filed Nov. 14, 2007 to Restriction Requirement mailed Jun. 14, 2007", 5 pgs.

"U.S. Appl. No. 10/612,292, Restriction Requirement mailed Jun. 7, 2005", 5 pgs.

"U.S. Appl. No. 10/612,292, Restriction Requirement mailed Jun. 14, 2007", 6 pgs.

"U.S. Appl. No. 10/612,292, Notice of Allowance mailed Mar. 3, 2008", 12 pgs.

"U.S. Appl. No. 10/750,340, Response filed Oct. 16, 2007 to Non-Final Office Action mailed May 16, 2007", 10 pgs.

"U.S. Appl. No. 10/612,292, Supplemental Notice of Allowability mailed Jun. 19, 2008", 11 pgs.

Frank, A., "Networking without wires", LAN Technology, vol. 8(3), (Mar. 1992), 14 pgs.

\* cited by examiner

SECURED AND SELECTIVE RUNTIME AUDITING SERVICES USING A TRUSTED COMPUTING DEVICE

RELATED APPLICATION

This application is a divisional of U.S. Ser. No. 10/612,292, filed Jun. 30, 2003, now issued as U.S. Pat. No. 7,409,370, which is incorporated herein its entirety.

TECHNICAL FIELD

This invention relates generally to electronic data processing and more particularly, to secured and selective runtime auditing services using a trusted computing device.

BACKGROUND

Computing devices (both wired and wireless) are being used to perform different types of electronic commerce transactions over a network. For example, mobile computing devices, such as cellular telephones, personal digital assistants (PDAs), etc., are used to purchase and/or update the purchase of an electronic (e)-Ticket (for a music concert, an airline ticket, etc.). Auditing of such transactions may subsequently become important for both legal and non-repudiation purposes. In particular, audit logs of transactions may provide evidence of the details of the transaction (e.g., monetary amount, parties involved, time, etc.).

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a computing device 100 can be located in FIG. 1. However, reference numbers are the same for those elements that are the same across different Figures. In the drawings.

DETAILED DESCRIPTION

Methods, apparatuses and systems for secured and selective runtime auditing services using a trusted computing device are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for secured selective runtime audit services in a computing device, in accordance with embodiments of the invention. A number of figures show flow diagrams illustrating operations for secured selective runtime audit services in a computing device. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

Figure 1:
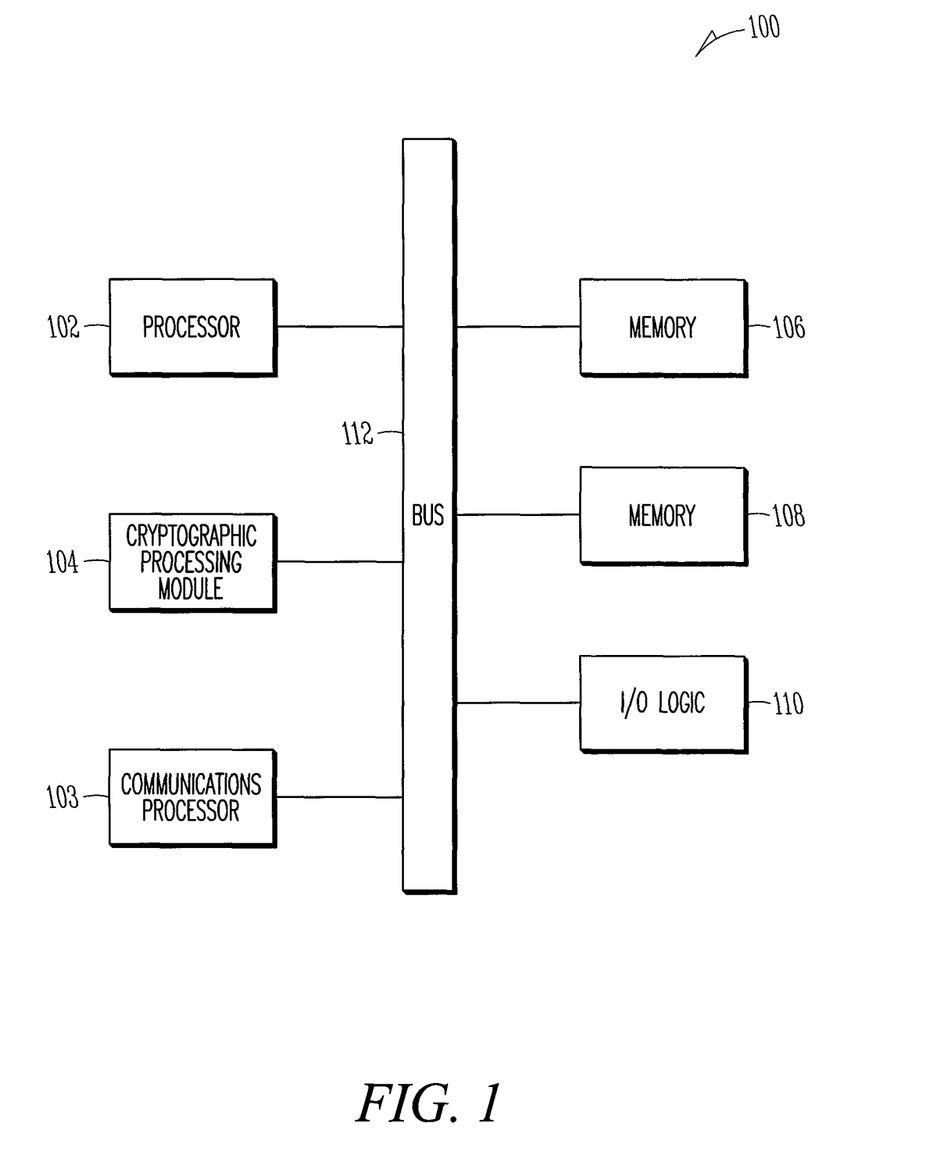
FIG. 1 illustrates a computing device that provides for secured and selective runtime audit services of transactions executed therein, according to one embodiment of the invention.

FIG. 1 illustrates a computing device that provides for secured and selective runtime audit services of transactions executed therein, according to one embodiment of the invention. FIG. 1 illustrates a computing device 100 that includes a processor 102, a communications processor 103, a cryptographic processing module 104, a memory 106, a memory 108 and an input/output logic 110 that are coupled together through a bus 112. In an embodiment, the computing device 100 may be different types of wireless and/or wired computing devices. For example, the computing device 100 may be a cellular telephone, a PDA, a notebook computer, a desktop computer, etc.

While the memory 106 may be of any suitable type of memory, in an embodiment, the memory 106 is different types of Random Access Memory (RAM) (e.g., Synchronous RAM (SRAM), Synchronous Dynamic RAM (SDRAM), Dynamic RAM (DRAM), Double Data Rate (DDR)-SDRAM, etc.) of varying size (e.g., one megabyte, two megabytes, etc.). While the memory 108 may also be of any suitable type of memory, in an embodiment, the memory 108 is Electrically Erasable Programmable Read-Only Memory (EEPROM), such as a flash memory, of varying size (e.g., 32 megabytes, 64 megabytes, etc.) or a general-purpose storage disk (e.g., hard disk). As further described below, the memory 106 and the memory 108 may store audit logs associated with different audit sessions.

As described in more detail below, in an embodiment, the computing device 100 communicates with other entities (e.g., a server on a network) to execute transactions. For example, the computing device 100 may execute mobile electronic (m)-Commerce transactions with a server to purchase/update e-Tickets, airline tickets, concert tickets, etc.

The I/O logic 110 provides an interface to I/O devices or peripheral components for the computing device 100. The I/O logic 110 may comprise any suitable interface controllers to provide for any suitable communication link to different components of the computing device 100. The I/O logic 110 for one embodiment provides suitable arbitration and buffering for one of a number of interfaces. In an embodiment, the I/O logic 110 includes a network interface to provide an interface to one or more remote devices over a number of communication networks (the Internet, an Intranet network, an Ethernet-based network, etc.) based on a number of different communication network protocols. For example, in an embodiment, the I/O logic 110 is to receive and transmit electronic commerce transactions between the system 100 and a different entity (e.g., a web site application executing on a server of a service provider).

The communications processor 103 may be different types of processors to execute instructions/applications for processing of the communications for the computing device 100 received into the I/O logic 110. The communications processor 103 may process communications based on any of a number of different protocols on a number of different I/O ports of the I/O logic 110.

The processor 102 may be different types of general purpose application processors. As further described below, instructions/applications executing within the processor 102 may process transactions between the computing device 100 and a different entity. This processing may include the exchange of data (e.g., identification of transaction, monetary amount of transaction, method of payment, the identification of the entities/parties involved in the transaction, the entities/parties involved in the transaction, the transaction initiation and termination times, etc.) with a web site on a server selling e-Tickets, etc. In an embodiment, the computing device 100 stores electronic money (using, for example, an electronic (e)-wallet), wherein such electronic money may be used as the method of payment in the transactions. In one embodiment, instructions/applications executing within the computing device 100 (including those executing in the processor 102) use the cryptographic processing module 104 to selectively audit the transactions between the computing device 100 and a different entity. Additionally, such applications may uses the cryptographic processing module 104 to selectively audit deposits and withdraws of the electronic money stored therein. Therefore, a number of audit logs are generated for tracking the different transactions being executed in the computing device 100.

In an embodiment, the cryptographic processing module 104 is hardware logic that may be embedded within the main circuit board of the computing device 100. The cryptographic processing module 104 may be circuitry formed as part of the fabrication of the main circuit board of the computing device 100. In an embodiment, the cryptographic processing module 104 may be a separate component that is attached (post fabrication) to the main circuit board (through, for example, a socket connection). A more detailed description of one embodiment of the cryptographic processing module 104 is now described.

Figure 2:
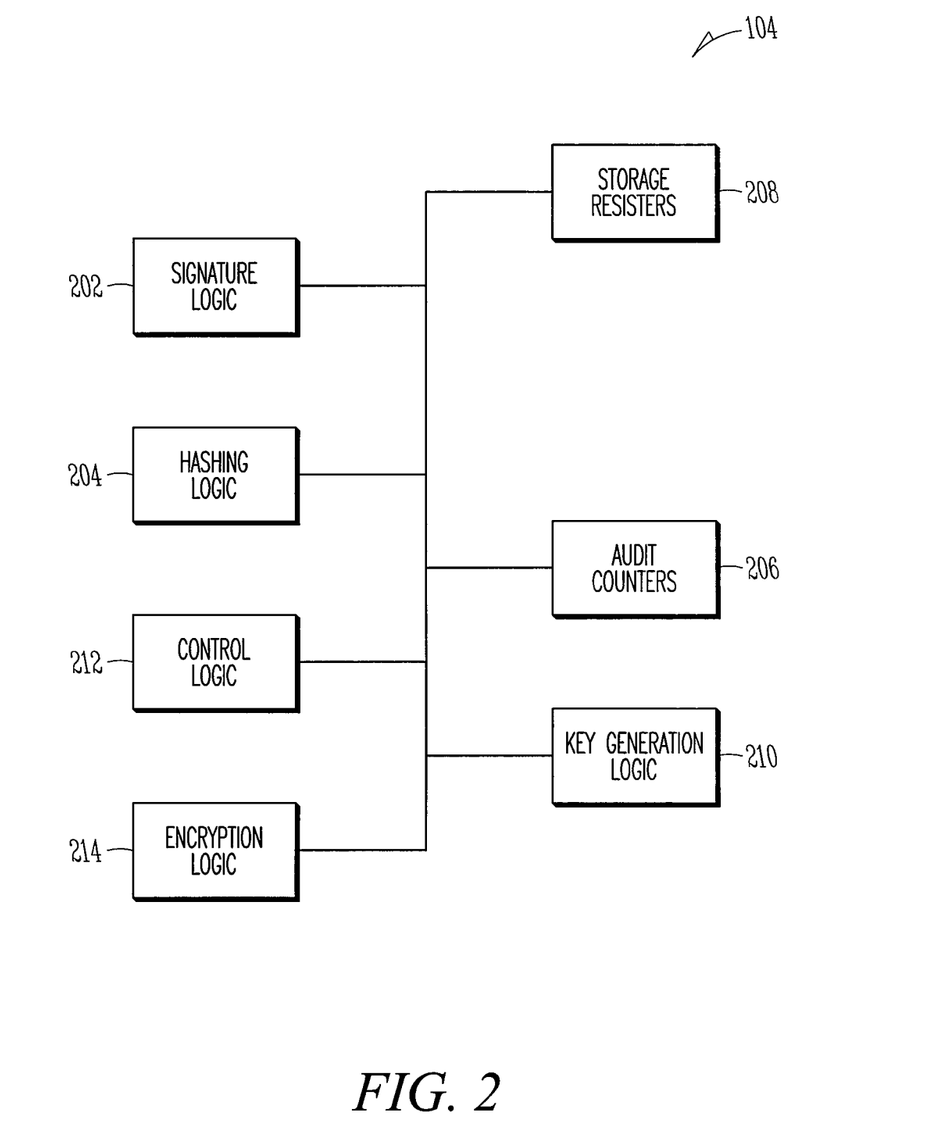
FIG. 2 illustrates a cryptographic processing module for performing secured and selective runtime audit services, according to one embodiment of the invention.

FIG. 2 illustrates a cryptographic processing module for performing secured and selective runtime audit services, according to one embodiment of the invention. FIG. 2 illustrates one embodiment of the cryptographic processing module 104, which includes a signature logic 202, a hashing logic 204, an audit counter 206, a number of storage registers 208, a key generation logic 210, a control logic 212 and an encryption logic 214 which are coupled together.

In one embodiment, a selected number of transactions that are performed between the computing device 100 and a different entity are audited (e.g., less than all of the transactions are audited). As described in more detail below, applications executing on processor 102 (e.g., application 302/runtime event log 304 shown in FIG. 3) selects the transactions to be audited based on the type of transaction. In one embodiment, an audit session is opened (activated) when an audit event is received into the computing device 100 and an audit session is not currently open. For example, a given electronic commerce transaction with a given web site (e.g., purchase of an airline ticket) may generate an audit event. Additionally, the network operator and/or the provider of services for the computing device 100 may generate an audit session by initiating an audit event. To illustrate, the network operator and/or the service provider may transmit an audit event to the computing device 100 that initiates an audit session in order to capture attributes of transactions for a given time period or set of transaction sessions. For example, the network operator and/or the service provider may initiate an audit session if certain suspicious activity by the user of the computing device 100 is detected. To illustrate, the network operator and/or service provider may initiate an audit session if the computing device 100 is suspected of being maliciously-used to purchase a large number airline tickets for a number of different locations in a short period of time.

The hashing logic 204 generates an integrity metric (a hash or digest value) representative of the audit log of a given audit session. While the hashing logic 204 may generate the integrity metric based on a suitable hashing operation, in one embodiment, the hashing operation is based on different versions of Secure Hash Algorithm (SHA) or Message Digest (MD) operations (e.g., SHA-1, MD-5, etc.).

The key generation logic 210 generates different types of encryption keys. The key generation logic 210 may generate the encryption key based on the Rivest, Shamir, and Adelman (RSA) algorithm. In one embodiment, the encryption key is a hardware-based encryption key that is generated and/or stored within the cryptographic processing module 104. The key generation logic 210 may generate either asymmetric encryption keys or symmetric encryption keys. Additionally, the encryption key may be either a symmetric or asymmetric key. In one embodiment, the signature logic 202 encrypts (digitally signs) the integrity metric with a signature encryption key generated by the key generation logic 210, thereby generating a digital signature of the integrity metric (a signed integrity metric).

The encryption logic 214 also may encrypt the audit logs of the different audit sessions. In one embodiment, the key generation logic 210 also generates an encryption key (that is different from the signature encryption key for the digital signature) used by the encryption logic 214 to encrypt the audit logs for additional security. The encryption logic 214 may encrypt the audit logs based on either symmetric key cryptography or an asymmetric key cryptography. For example, the encryption logic 214 may encrypt the audit logs based on the Data Encryption Standard (DES).

In one embodiment, the audit counter 206 is a non-volatile counter whose use is limited to maintaining a count related to auditing sessions of the transactions. The audit counter 206 is incremented once for each audit session, when the first audit event for the audit session occurs. In an embodiment, the control logic 212 opens an audit session and increments the value of the audit counter 206 after receipt of an audit event when an audit session is not open. Accordingly, the audit counter 206 sequences audit logs/trails across audit sessions.

In one embodiment, the computing device 100 and the cryptographic processing module 104 contained therein are matched with regard to the expected number of audit sessions for a given computing device 100. In other words, the lifetime of operation of the computing device 100 is such that the audit counter 206 does not roll over. For example, in one embodiment, the audit counter 206 is expected to roll over after approximately seven years of operation or at least 100,000 audit sessions. In another embodiment, the audit counter 206 may roll over after a lesser or greater number of years of operation or for a lesser or greater number of audit sessions. However, embodiments of the invention are not so limited. In an alternative embodiment, the audit counter 206 may roll over during the lifetime of operation of the computing device 100. Alternatively, a system clock executing within the computing device 100 may be used to provide the audit session count.

The storage registers 208 are memory storage devices internal to the cryptographic processing module 104. As described below, in one embodiment, the audit log for a given audit session is stored within a part of one of the storage registers 208. Moreover, the integrity metric generated by the hashing logic 204 and signed by the signature logic 202 is stored with the associated audit log within the storage registers 208. The storage register 208 may be partitioned into a number of parts, thereby allowing the storage of multiple audit logs in a given storage register 208. The operations of the computing device 100 will now be described.

Figure 3:
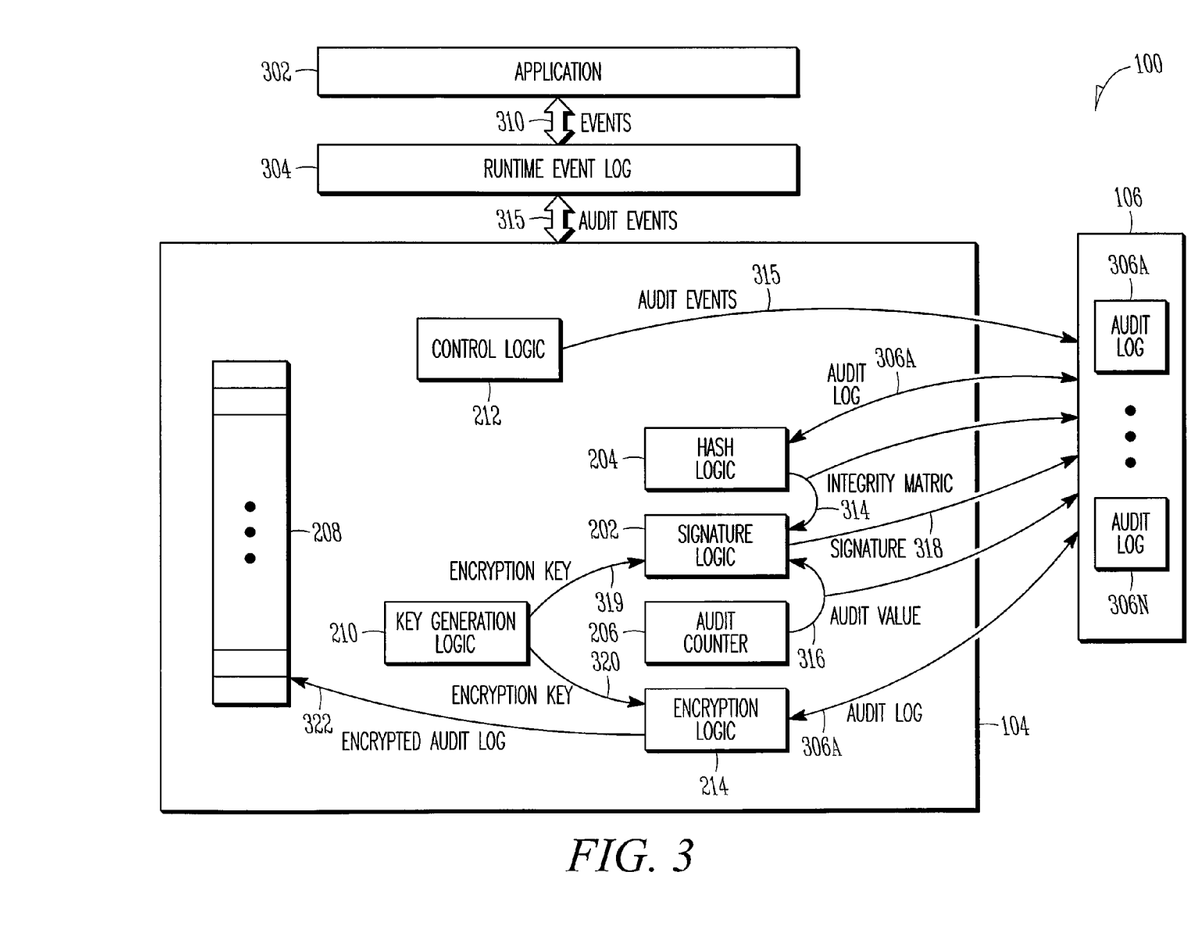
FIG. 3 illustrates the messaging related to the different operations of a computing device for performing secured and selective runtime audit services, according to one embodiment of the invention.

FIG. 3 illustrates the messaging related to the different operations of a computing device for performing secured and selective runtime audit services, according to one embodiment of the invention. As shown, the computing device 100 includes an application 302, a runtime event log 304, the cryptographic processing module 104 and the memory 106. In an embodiment, the application 302 and the runtime event log 304 are operations executing in the processor 102 (shown in FIG. 1).

The application 302 processes the different transactions between the computing device 100 and a separate entity (as described above). The application 302 transmits events 310 to the runtime event log 304. The events 310 may include execution of a function within the application 302, wherein an event is to be audited when a Boolean value-based parameter of the function is set to a logical high. Examples of the events 310 may be initiation/termination of a transaction, initiation/termination of an audit session, etc. In one embodiment, the runtime event log 304 is a standard Java method or Java Native Interface (JNI) that is modified to allow for selected auditing of transactions by the computing device 100. In an embodiment, the runtime event log 304 may be an MS.NET assembly, a Web Service or other type of application executing within the computing device 100. The runtime event log 304 selects/determines whether the events are to be audited (which is described in more detail below). The runtime event log 304 transmits the events 315 to the control logic 212 of the cryptographic processing module 104.

As shown, the control logic 212 transmits the audit events 315 to the associated audit log 306A-306N. In one embodiment, the audit events 315 may include attributes of the given transaction (e.g., identification of transaction, monetary amount of transaction, method of payment, the identification of the entities/parties involved in the transaction, the entities/parties involved in the transaction, the transaction initiation and termination times, etc.). If the event 310 received by the control logic 212 causes an audit session to be opened, the control logic 212 creates an audit log 306 for the given audit session. Therefore, when subsequent audit events 315 (such as different parts of the transaction) are received, the control logic 212 transmits the audit events 315 to the associated audit log 306. As further described below, an audit event 315 that closes the audit session is received. For example, the completion of a transaction between the computing device 100 and a remote server may generate an audit event 315 that closes the audit session. In one embodiment, an explicit command from the network operator/service provider of the computing device 100 may transmit an explicit audit event to close the current audit session.

Additionally, as shown, the hashing logic 204 retrieves the audit log 306 from the memory 106 after the associated audit session has been closed. The hashing logic 204 generates an integrity metric 314 based on the audit log 306. The signature logic 202 receives the integrity metric 314 and generates a digital signature 318 of the integrity metric 314. In one embodiment, the signature logic 202 requests an encryption key 319 from the key generation logic 210 and generates the digital signature 318 using the encryption key 319. In one embodiment, the signature logic 202 also receives the current value of the audit counter 206 (audit value 316) and generates a digital signature 318 of the audit value 316 (using the same encryption key 319 or a different encryption key). Alternatively, the signature logic 202 receives the integrity metric 314 and the audit value 316 and generates a single digital signature 318 of the integrity metric 314 and the audit value 316 (using the encryption key 319).

In one embodiment, the integrity metric 314, the digital signature 318 and the audit value 316 are stored with the associated audit log 306. For example, the digital signature 318, the integrity metric 314 and the audit value 316 are appended to the associated audit log 306. In another embodiment, only the digital signature 318 is stored with the audit log 306.

The encryption logic 214 requests an encryption key 320 (that is different from the encryption key 319) from the key generation logic 210 and encrypts the associated audit log 306. In an embodiment, the encryption logic 214 encrypts the audit data (e.g., the attributes of the transaction) (not including the integrity metric 314, the audit value 316 or the signature 318). In an alternative embodiment, the encryption logic 214 encrypts the audit data along with the integrity metric 314, the audit value 316 and the signature 318. While FIG. 3 illustrates the encryption logic 214 storing the encrypted audit log 322 in a part of one of the storage registers 208, in an embodiment, the encrypted audit log 322 may be stored in a memory external to the cryptographic processing module 104 (e.g., the memory 106, the memory 108, etc.), which is described in more detail below.

Figure 4A:
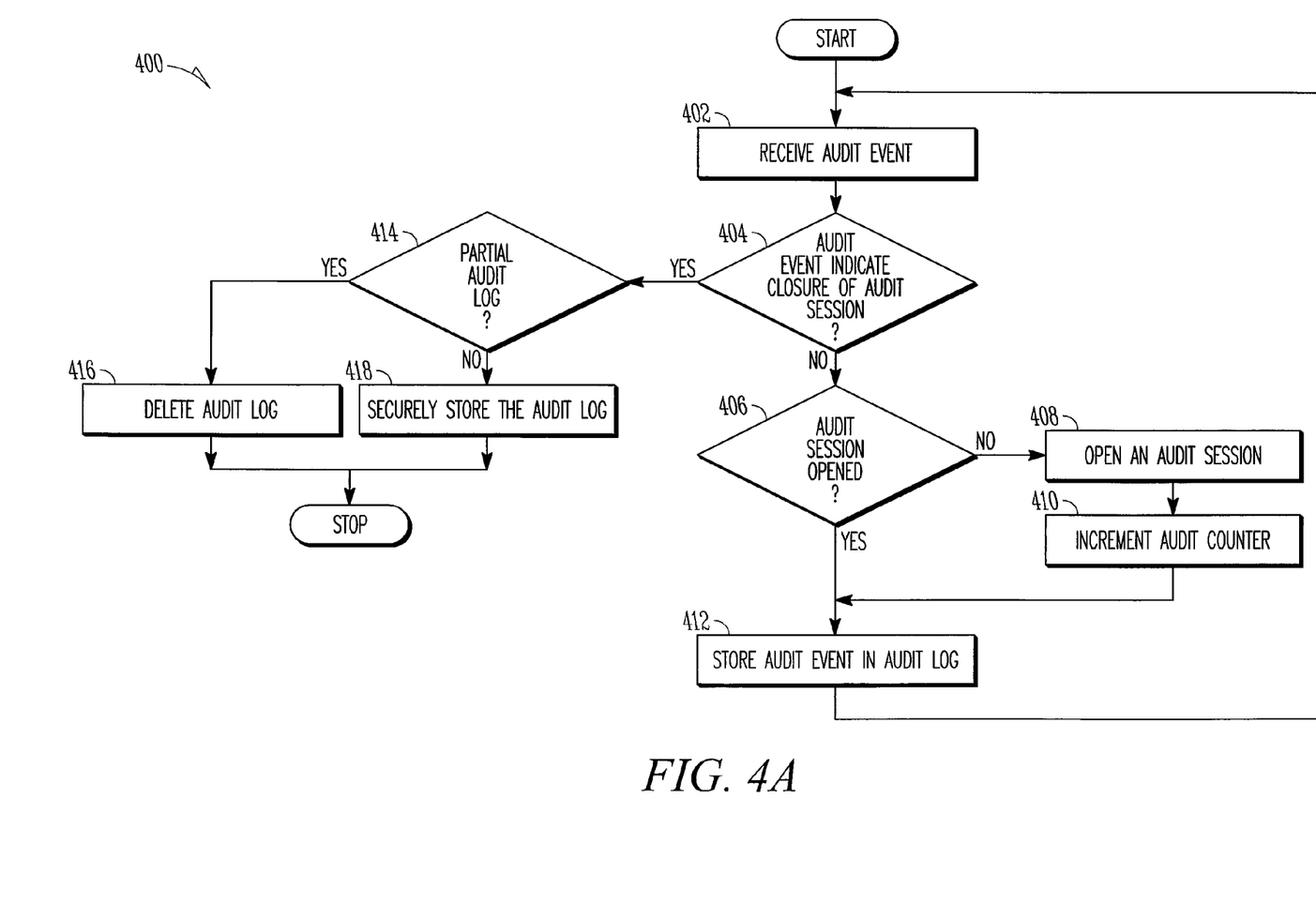
FIGS. 4A-4B illustrates a flow diagram for secured and selective audit services, according to one embodiment of the invention.
Figure 4B:
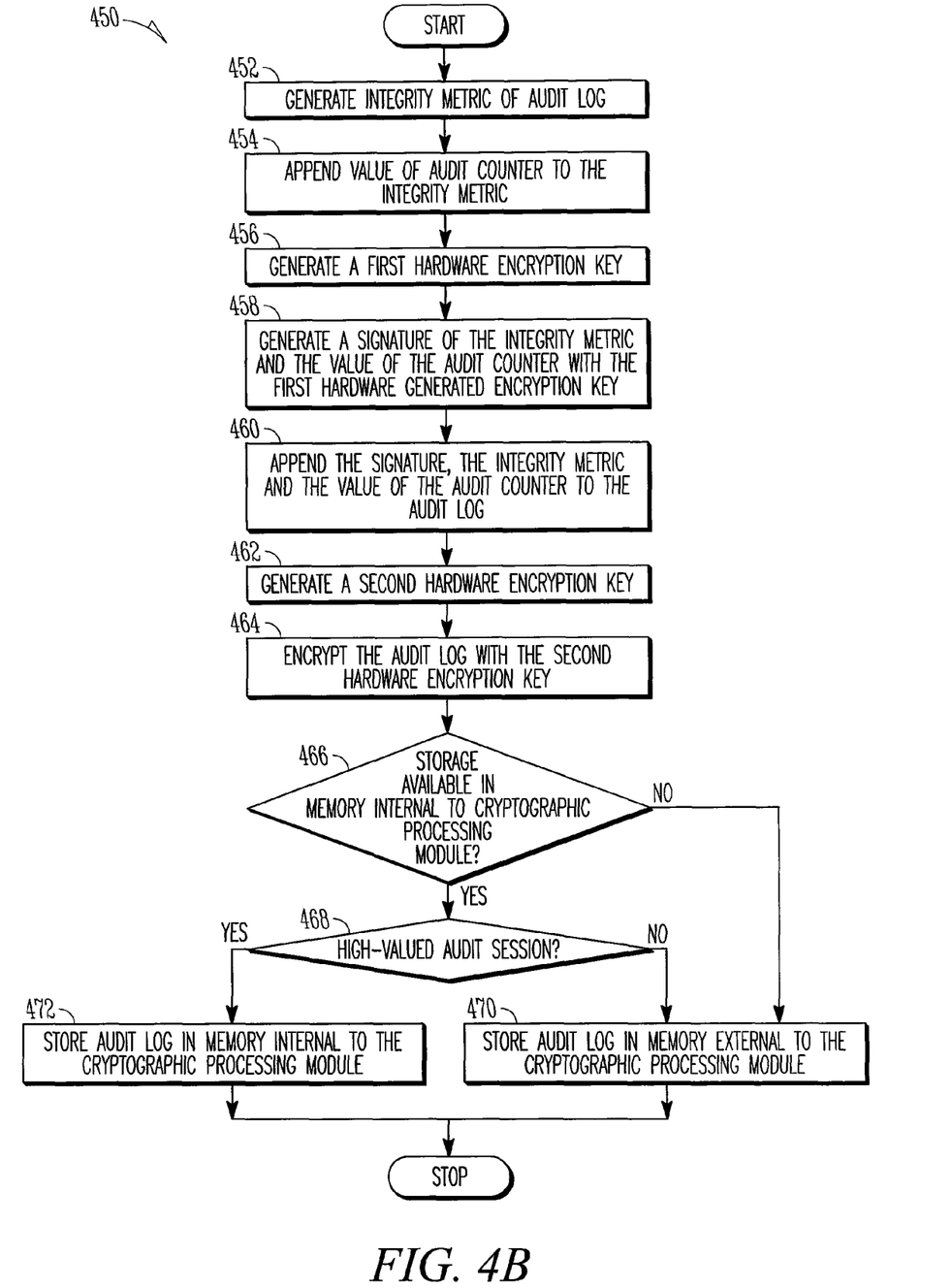

The operations of secured selective audit services will now be described. FIGS. 4A-4B illustrates a flow diagram for secured and selective audit services, according to one embodiment of the invention.

In block 402 of the flow diagram 400 (of FIG. 4A), an audit event is received. With reference to the embodiment in FIG. 3, the runtime event log 304 receives a number of different events 310 (including events to be audited) and determines whether the event is to be audited. In one embodiment, the commands executed by the application 302 have associated command ordinals. A given command ordinal has an associated indicator stored in the storage registers 208 that indicates whether execution of the command by the application 302 generates an audit event. Accordingly, the runtime event log 304 determines whether a transaction is to be audited based on the associated indicator stored in the storage registers 208. In one embodiment, the commands that are selectively audited may be dynamically adjusted. For example, the network operator of the computing device 100 and/or the service provider for this computing device 100 may download modifications to the list of commands that are to be audited into the computing device 100. Control continues at block 404.

In block 404, a determination is made of whether the audit event indicates closure of an audit session. With reference to the embodiment in FIG. 3, the control logic 202 determines whether the audit event indicates closure of an audit session. As described above, a number of different audit events may indicate closure of a current audit session. For example, the completion of a transaction may serve as an indication that the current audit session is to be closed. In one embodiment, an explicit command from the network operator/service provider of the computing device 100 may transmit an explicit audit event to close the current audit session. Upon determining that the audit event indicates closure of an audit session, control continues at block 412, which is described in more detail below.

In block 406, upon determining that the audit event does not indicate closure of an audit session, a determination is made of whether an audit session is open. With reference to the embodiment in FIG. 3, the control logic 212 determines whether an audit session is open. In an embodiment, only one audit session at a time may be open. Upon determining that an audit session is open, control continues at block 410, which is described in more detail below.

In block 408, upon determining that an audit session is not open, an audit session is opened. With reference to the embodiment in FIG. 3, the control logic 212 opens an audit session. The control logic 212 creates the associated audit log 306 within the memory 106 for this audit session. In one embodiment, the control logic 212 may apply a time stamp to the associated audit log 306. For example, the control logic 212 may append a time stamp to the associated audit log 306. In an embodiment, the cryptographic processing module 104 includes a timer that is non-volatile. Accordingly, the control logic 212 applies a timestamp that is the number of ticks of this timer within the cryptographic processing module 104. Such timestamps may protect against replay attacks, where the messages involved in the transactions are intercepted and subsequently replayed. Therefore, if the audit log includes a timestamp, a replay of the messages of the transactions can be differentiated because the times are different. Control continues at block 410.

In block 410, the audit counter is incremented. With reference to the embodiment in FIG. 3, the control logic 212 increments the value of the audit counter 206. Accordingly, the value of the audit counter 206 is incremented each time an audit session is opened. Therefore, (assuming that the audit counter 206 does not roll over during the life time operation of the computing device 100), the different audit sessions will have unique values for the audit counter 206. Control continues at block 412.

In block 412, the audit event is stored in the audit log. With reference to the embodiment in FIG. 3, the control logic 212 stores the audit events 315 into the current audit log 306. Therefore, the different audit events 315 that occur while the audit session is open are stored in the associated audit log. For example, an audit session may be opened when an electronic commerce transaction is initiated between the computing device 100 and a different entity. During the electronic commerce transaction, a number of operations that exchange data between the computing device 100 and the different entity are performed by the application 302 executing on the processor 102. Such operations may be audit events. Therefore, the attributes of the electronic commerce transaction are stored in the audit log. After storage of the audit event into the audit log, control continues at block 402, wherein the operations of the flow diagram 400 wait to receive another audit event.

In block 414, upon determining that an audit event indicates closure of an audit session, a determination is made of whether there is a partial audit log. With reference to the embodiment in FIG. 3, the control logic 212 determines whether there is a partial audit log. In an embodiment, the audit log is considered partial if a transaction is not complete prior to receiving an audit event that indicates that the audit session is to be closed. For example, the computing device 100 may be involved in an electronic commerce transaction when an explicit audit event is received from the service provider to close a current audit session. To further illustrate, the computing device 100 may be involved in an electronic commerce transaction when power of the computing device 100 is lost (dead batteries, user turns off power, etc.) or network connection is interrupted. This loss of power or interruption of the network connection may cause the audit session to close prior to completion of the electronic commerce transaction.

In block 416, upon determining that there is a partial audit log, the audit log is deleted. With reference to the embodiment in FIG. 3, the control logic 212 deletes the partial audit log. Partial audit logs may be deleted because such logs cannot be used to audit the transactions. The partial audit logs may be corrupted because the control logic 212 may have been in the process of storing an audit event 315 into the audit log 306 when power was lost or the network connection was interrupted, thereby only storing a part of the audit event 315. Because the integrity of partial audit logs cannot used to perform audits, the unused audit logs 306 are deleted, in order to preserve space within the memory that is of limited size internal and/or external to the cryptographic processing module 104. The operations of the flow diagram 400 are completed.

In block 418, upon determining that the audit log is not partial, the audit log is securely stored. With reference to the embodiment in FIG. 3, a number of the components of the cryptographic processing module 104 (such as the hashing logic 204, the signature logic 202, the audit counter 206, the key generation logic 210, the encryption logic 214, etc.) securely store the audit logs 306 in the storage registers 208, the memory 106 or the memory 108.

A more detailed description of this secure storage of the audit log is now described with reference to the flow diagram 450 of FIG. 4B. In block 452, an integrity metric of the audit log is generated. With reference to the embodiment in FIG. 3, the hashing logic 204 retrieves the audit log 306 from the memory 106 and generates an integrity metric (hash value, audit digest) representative of the data within the audit log 306. Control continues at block 454.

In block 454, the value of the audit counter is appended to the integrity metric. With reference to the embodiment in FIG. 3, the signature logic 202 receives the integrity metric 314 and the value of the audit counter 206 (the audit value 316) and appends the value of the audit value 316 to the integrity metric 314. Control continues at block 456.

In block 456, a first hardware encryption key is generated. With reference to the embodiment in FIG. 3, the key generation logic 210 generates a first hardware encryption key 319. The key generation logic 210 may generate a number of different encryption keys based upon requests from different components within the cryptographic processing module 104, the application 302 or the runtime event log 304. Accordingly, the key generation logic 210 generates the first hardware encryption key 319 based on a request from the signature logic 202. Control continues at block 458.

In block 458, a signature of the integrity metric and the value of the audit counter is generated based on the first hardware encryption key. With reference to the embodiment in FIG. 3, the signature logic 202 generates a digital signature of the integrity metric 314 and the audit value 316. The signature logic 202 signs the integrity metric 314 and the audit value 316 with the first hardware encryption key 319 using any of a number of suitable encryption operations. While described such that a single digital signature of the integrity metric 314 and the audit value 316 is generated, embodiments of the invention are not so limited. In an alternative embodiment, the signature logic 202 generates a digital signature of only the integrity metric 314, thereby leaving the audit value 316 unencrypted. In another embodiment, the signature logic 202 generates a first digital signature of the integrity metric 314 and a second digital signature of the audit value 316. Control continues at block 460.

In block 460, the signature, the integrity metric and the value of the audit counter are appended to the audit log. With reference to the embodiment in FIG. 3, the signature logic 202 and/or or the hashing logic 204 appends the digital signature 318, the integrity metric 314 and the audit value 316 to the associated audit log 306. In an alternative embodiment, the signature logic 202 only appends the digital signature 318 to the associated audit log 306. Control continues at block 462.

In block 462, a second hardware encryption key is generated. With reference to the embodiment in FIG. 3, the key generation logic 210 generates a second hardware encryption key 320. The key generation logic 210 may generate the second hardware encryption key 320 based on a request from the encryption logic 214. Control continues at block 464.

In block 464, the audit log is encrypted with the second hardware encryption key. With reference to the embodiment in FIG. 3, the encryption logic 214 encrypts the audit log 306 with the second hardware encryption key 320. As described above, the encryption logic 214 may encrypt the audit data (not including the integrity metric 314, the audit value 316 or the signature 318). In an alternative embodiment, the encryption logic 214 encrypts the audit data along with the integrity metric 314, the audit value 316 and the signature 318. Control continues at block 466.

In block 466, a determination is made of whether storage is available in memory that is internal to the cryptographic processing module. With reference to the embodiment in FIG. 3, the control logic 212 determines whether storage is available in the storage registers 208 in the cryptographic processing module 104. Upon determining that storage is not available in memory that is internal to the cryptographic processing module 104, control continues at block 470, which is described in more detail below.

In block 468, upon determining that storage is available in internal memory of the cryptographic processing module, a determination is made of whether the audit session is considered a high-valued audit session. With reference to the embodiment in FIG. 3, the control logic 212 determines whether the audit session is considered a high-valued audit session. An audit session may be considered of high-value based on a number of different criteria. For example, the criteria could include the values of attributes of transactions that occur in the audit session. In one embodiment, the audit session is considered of high-value if a monetary amount of an electronic commerce transaction is above a given limit. The audit session may be considered of high-value if an electronic commerce transaction involving a given entity (for a service provider, etc.) occurs within this session. Upon determining that the audit session is not of high value, control continues at block 470, which is now described.

In block 470, the encrypted audit log is stored in a memory that is external to the cryptographic processing module. With reference to the embodiment in FIG. 3, the encryption logic 214 may store the encrypted audit log 322 in either the memory 106 or the memory 108 (shown in FIG. 1). The operations of the flow diagram 450 are complete.

In block 472, the encrypted audit log is stored in a memory that is internal to the cryptographic processing module. With reference to the embodiment in FIG. 3, the encryption logic 214 may store the encrypted audit log 322 in a part of one of the available storage registers 208. The operations of the flow diagram 450 are complete.

While the flow diagram 450 illustrates a number of operations in a given order for the secure storage of the audit log, in another embodiment, the order of such operations may be modified. For example, in an embodiment, the generation of the digital signature of the integrity metric and/or the audit value is independent of the encryption of the audit log. Accordingly, the encryption of the audit log may be performed prior to, during and/or after the generation of the digital signature of the audit log.

Additionally, the flow diagram 450 may be modified such that the encrypted audit logs are not differentiated based on the value of the audit session. Accordingly, the encrypted audit logs are stored in the storage registers 208 until there is no storage available in the storage registers 208. The encrypted audit logs are subsequently stored in one of the memory external to the cryptographic processing module 104 (e.g., a flash memory, a hard disk, etc.).

Figure 5:
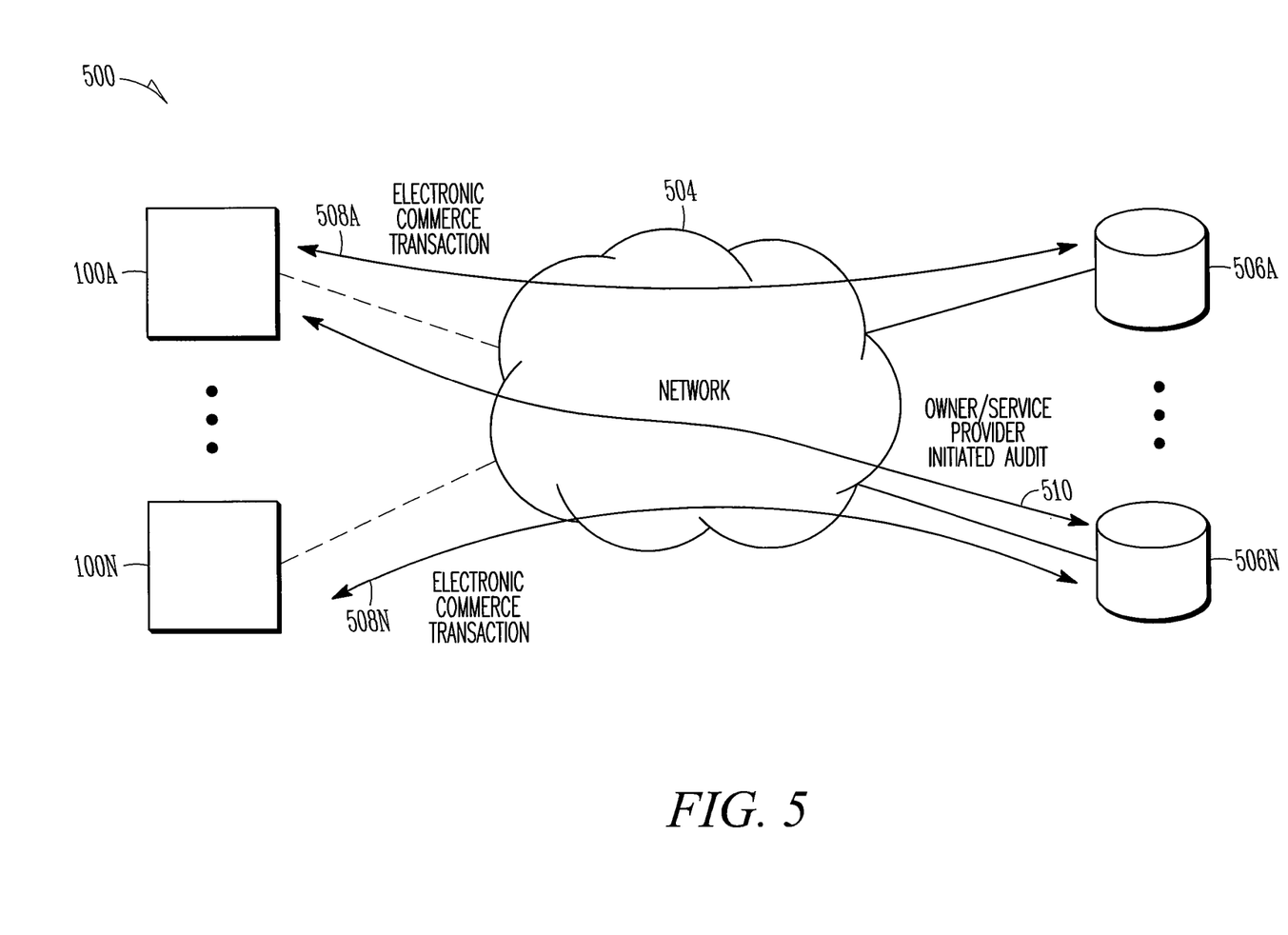
FIG. 5 illustrates a system wherein secured and selective audit services are performed, according to one embodiment of the invention.

FIG. 5 illustrates a system wherein secured and selective audit services are performed, according to one embodiment of the invention. FIG. 5 illustrates a system 500 that includes a number of computing devices 100A-100N and a number of servers 506A-506N that are coupled together through a network 504. The network 504 may be a wide area network, a local area network or a combination of different networks that provide communication between the number of computing devices 100A-100N and the number of servers 506A-506N.

For example, the number of computing devices 100A-100N may be different types of wireless computing devices, wherein a part of the network 504 is configured to process wireless communications, while a different part of the network 504 may be configured to process wired communications for communications with the number of computing devices 100A-100N and the number of servers 506A-506N.

Users of the number of computing devices 100A-100N may perform different electronic commerce transactions with different applications executing on the number of servers 506A-506N. The number of computing devices 100A-100N perform secured selective audit operations of these electronic commerce transactions, as described above. For example, the computing device 100A may be a cellular telephone, wherein a user of the computing device 100A buys an airline ticket or changes an airline reservation using the web site for the airline executing on the server 506A. As shown, FIG. 5 illustrates an electronic commerce transaction 508A between the computing device 100A and the server 506A. FIG. 5 also illustrates an electronic commerce transaction 508N between the computing device 100N and the server 506N. These electronic commerce transactions 506A and 506N may open audit sessions within the computing devices 100A and 100N, respectively. The system 500 also illustrates a device/platform owner or a service provider initiated audit event 510. As previously described, the device/platform owner or service provider of the computing devices 100 may generate audit events in order to activate and close an audit session. Therefore, a selected number of events executing within the computing devices 100A-100N cause the opening/closing of an audit session, wherein an audit log records audit events.

Accordingly, as described, embodiments of the invention may be used to support a secured independent log of a user's activities with regard to different computing devices. Embodiments of the invention can maintain a log of activities of a computing device (e.g., mobile devices) for different types of mobile (m)-Commerce applications. Moreover, embodiments of the invention allow for the digitally signing of these logs based on the identity of the platform of the computing device (using an encryption key that is associated with the hardware platform of the computing device) in order to establish the authenticity and integrity of such logs. These digital signatures may be securely stored in secure storage registers that are internal to the cryptographic processing module within the computing device. Moreover, the audit logs may be encrypted based on the identity of the platform (using a different encryption key that is associated with the hardware platform of the computing device).

Therefore, embodiments of the invention generate audit transactions that may be used for statistics and track usage. For example, for transactions involving eTicket usage, as a statistic, a device operator/service provider of computing devices can use the audit data to determine how many persons changed their eTicket during a given period. For tracking usage, the device operator/service provider may track when an eTicket was changed for a particular user. Such usage data can help track down issues in eTicket management and distribution.

Embodiments of the invention provide for support for auditing of different transactions for both legal and non-repudiation purposes. In particular, such a log may serve as evidence with regard to the innocence or guilt of a user of a computing device in the event of misappropriation of the services. For example, such a log allows for the tracking of the transactions to determine how duplication occurred of a high-valued eTicket that has been downloaded into a computing device.

Thus, methods, apparatuses and systems for secured and selective runtime audit services in a computing device have been described. Although the invention has been described with reference to specific exemplary embodiments, it will be evident that various modifications and changes may be made to these embodiments without departing from the broader spirit and scope of the invention. For example, while secured and selective audit operations of commerce transactions are described, embodiments of the invention may include secured and selective audit operations of other type of transaction (such as downloads of software applications/patches/upgrades, ring tones from wireless operators, etc.). Moreover, embodiments of the invention may be executed within a suitable device executing a secured operating system/kernel. Accordingly, the secured operating system/kernel executes on a trusted platform wherein generation of encryption keys, encryption and hashing are secured operations executing within a hardware logic (as described herein). Therefore, the secured operating system/kernel may be modified to selectively and securely audit different operations execution within this device. The secured operating system/kernel may communicate with an application similar to the runtime event log 304 to selectively and securely audit different operations. Therefore, the specification and drawings are to be regarded in an illustrative rather than a restrictive sense.

What is claimed is:

1. A method comprising:
   detecting an audit event, using a runtime event log, in response to execution of a command by an application executing on a computing device when the command has an associated command ordinal that corresponds to an indicator stored in at least one storage register of the computing device, commands executed by the application having associated command ordinals; and
   selectively auditing a number of transactions between a computing device and a separate device based on the detected audit event associated with the number of transactions using a cryptographic processing module within the computing device, the cryptographic processing module being at least one of hardware logic embedded within a main circuit board of the computing device or a separate hardware component that is attached to the main circuit board, wherein selectively auditing of the number of transactions includes securely storing at least one attribute of selected audited transactions within the computing device.

2. The method of claim 1, wherein securely storing the at least one attribute of one of the selected audited transactions comprises:
   storing at least one attribute of the selected audited transaction into an audit log into a memory in the computing device; and
   encrypting the audit log based on an encryption key that is generated by key generation logic of the cryptographic processing module and stored within the computing device.

3. The method of claim 2, wherein the computing device is configured to communicate wirelessly, and wherein the encryption key is stored within a memory within the cryptographic processing module of the wireless computing device.

4. The method of claim 2, wherein securely storing the at least one attribute of one of the selected audited transactions comprises:
   storing the encrypted audit log in a first memory of the cryptographic processing module in the computing device which performed the encrypting, in response to a determination that an audit session that includes the number of audit transactions is a high-valued audit session; and storing the encrypted audit log in a second memory that is external to the cryptographic processing module, in response to a determination that the audit session is not a high-value audit session;

wherein the computing device is configured to communicate wirelessly.

5. The method of claim 1, wherein securely storing the at least one attribute comprises:

generating an integrity metric of an audit log using hashing logic of the cryptographic processing module; and generating a signature of the integrity metric with signature logic of the cryptographic processing module using a signature key that is generated by key generation logic and stored within the computing device.

6. The method of claim 5, wherein securely storing the at least one attribute comprises:

incrementing an audit counter; and storing a value of the audit counter, the integrity metric and the signature in the audit log.

7. The method of claim 1, wherein the at least one attribute is selected from a group consisting of a type of transaction, a monetary amount of the transaction, and a time of the transaction.

8. The method of claim 1, wherein selectively auditing the number of transactions includes opening an audit session upon receipt of one of the selected audited transactions, wherein securely storing the at least one attribute of one of the selected audited transactions includes storing at least one attribute of the selected audited transaction into an audit log of a memory in the computing device.

9. The method of claim 8, wherein selectively auditing the number of transactions further comprises:

closing the audit session; and generating a hash of the audit log after the audit session is closed.

10. The method of claim 9, wherein selectively auditing the number of transactions further comprises generating a digital signature of the hash based a first encryption key, after the audit session is closed.

11. The method of claim 10, wherein selectively auditing the number of transactions further comprises storing the hash and the digital signature in the audit log, after the audit session is closed.

12. The method of claim 11, wherein selectively auditing the number of transactions further comprises encrypting the at least one attribute with a second encryption key, after the audit session is closed.

13. The method of claim 12, wherein the at least one attribute is selected from a group consisting of a type of transaction, a monetary amount of the transaction, and a time of the transaction.

14. A machine-readable medium that is not a transitory propagating signal, the machine-readable medium including instructions, which when executed by a machine, cause said machine to perform operations comprising:

detecting an audit event, using a runtime event log, in response to execution of a command by an application executing on a computing device when the command has an associated command ordinal that corresponds to an indicator stored in at least one storage register of the computing device, commands executed by the application having associated command ordinals; and selectively auditing a number of transactions between a computing device and a separate device based on the detected audit event associated with the number of transactions using a cryptographic processing module within the computing device, the cryptographic processing module being at least one of hardware logic embedded within a main circuit board of the computing device or a separate hardware component that is attached to the main circuit board, wherein selectively auditing of the number of transactions includes securely storing at least one attribute of selected audited transactions within the computing device.

15. The machine-readable medium of claim 14, wherein securely storing the at least one attribute of one of the selected audited transactions comprises:

storing at least one attribute of the selected audited transaction into an audit log into a memory in the computing device; and encrypting the audit log based on an encryption key that is generated and stored within the computing device.

16. The machine-readable medium of claim 15, wherein securely storing the at least one attribute comprises:

generating an integrity metric of the audit log; and generating a signature of the integrity metric with a signature key that is generated and stored within the computing device.

17. The machine-readable medium of claim 16, wherein securely storing the at least one attribute comprises:

incrementing an audit counter; and storing a value of the audit counter, the integrity metric and the signature in the audit log.

18. The machine-readable medium of claim 14, wherein selectively auditing the number of transactions includes opening an audit session upon receipt of one of the selected audited transactions, wherein securely storing the at least one attribute of one of the selected audited transactions includes storing at least one attribute of the selected audited transaction into an audit log of a memory in the computing device.

19. The machine-readable medium of claim 18, wherein selectively auditing the number of transactions further comprises:

closing the audit session; and generating a hash of the audit log after the audit session is closed.

20. The machine-readable medium of claim 19, wherein selectively auditing the number of transactions further comprises generating a digital signature of the hash based a first encryption key, after the audit session is closed.

21. The machine-readable medium of claim 20, wherein selectively auditing the number of transactions further comprises storing the hash and the digital signature in the audit log, after the audit session is closed.

22. The machine-readable medium of claim 21, wherein selectively auditing the number of transactions further comprises encrypting the at least one attribute with a second encryption key, after the audit session is closed.

23. The machine-readable medium of claim 22, wherein the at least one attribute is selected from a group consisting of a type of transaction, a monetary amount of the transaction, and a time of the transaction.

* * * * *